March 22, 1960    J. L. JONES    2,929,167
ILLUMINABLE ROD AND REEL HOLDER
Filed May 23, 1958
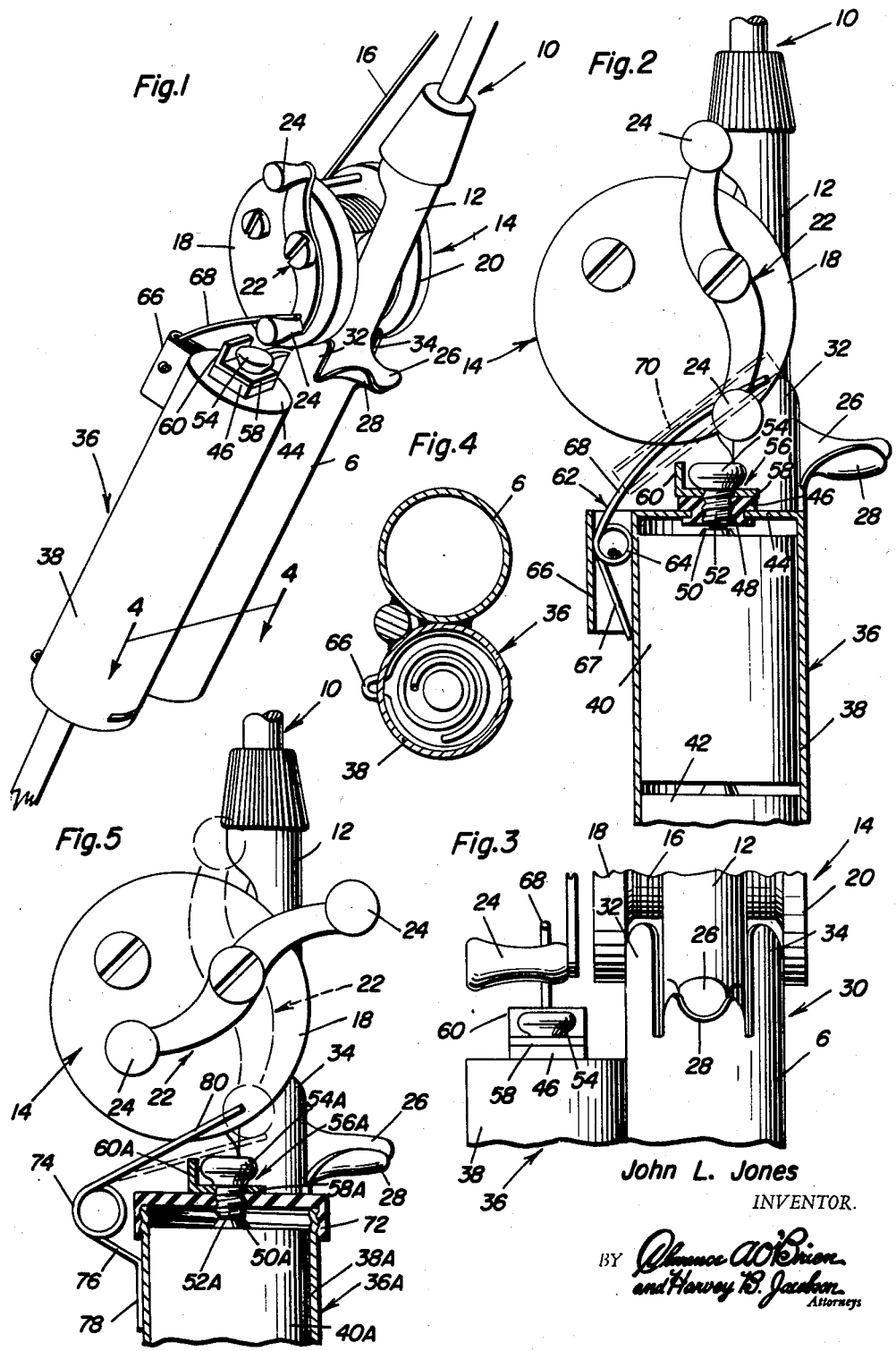
John L. Jones
INVENTOR.

United States Patent Office 2,929,167
Patented Mar. 22, 1960

2,929,167

ILLUMINABLE ROD AND REEL HOLDER

John L. Jones, Mott, N. Dak.

Application May 23, 1958, Serial No. 737,330

3 Claims. (Cl. 43—17)

This invention relates, primarily, to an improved illuminable holder for a reel-equipped fishing rod, and, incidentally, to a bite signal given by way of the source of illumination which is carried by and cooperable with the holder.

More in particular, the invention has to do with a rod holder characterized by a socket member provided with means whereby it may be staked down or otherwise secured to a stationary support. The means preferred may, as is often the case, take the form of a ground penetrating and anchoring stake. However, it is with the purview of the concept to provide a suitable clamp (not shown) so that the socket member may be attached to and anchored on a boat, warf or the like. The socket member is such in construction that it is adapted to telescopically receive and removably hold the fishing rod handle.

One object of the invention is to provide the upper end portion of the socket member with simple and reliable means, a laterally projecting saddle for example, which is shaped and provided with side retaining flanges and in which the usual finger-piece of the reel seat is removably keyed, whereby to assure that the rod and reel will stay put and will not be accidentally displaced or allowed to turn. However, and on the other hand, the saddle construction is such that the user may quickly and easily withdraw the rod handle from the socket member to play the fish.

Another object of the invention is to provide the holder with a flashlight provided at its top with insulation material which has a screw-threaded hole to accommodate the screw base of a lamp bulb. An L-shaped metal clip is carried by the base of the bulb and constitutes a stationary contact element. A coil spring having a resilient finger is attached to the casing of the flashlight and when released the finger automatically springs toward the clip and functions as a circuit closing contact element.

Other featured constructional details and attending advantages will become more readily apparent from the following description and the accompanying drawing.

In the drawing:

Fig. 1 is a perspective view of one form or embodiment of the improved rod holder and signaling means with which it is provided.

Fig. 2 is an enlarged view in which the details of the flashlight or signaling means are shown in section and elevation and wherein, in phantom lines and full lines the general mode of operation is shown.

Fig. 3 is a fragmentary view primarily in elevation illustrating certain of the other parts but particularly showing the aforementioned reel stabilizing guard or saddle.

Fig. 4 is a cross-section on an enlarged scale taken on the plane of line 4—4 of Fig. 1 with parts removed.

Fig. 5 is a view in section and elevation showing a second form or embodiment wherein the trippable contact finger is intermittently actuatable by the reel's handle.

Reference should be first to Figs. 1 to 4, inclusive.

The holder is preferably in the form of an elongated open ended tube providing a socket member 6. It is so made that it serves to telescopingly and removably receive the handle or hand-grip 8 of a fishing rod 10. The rod is provided with a reel seat 12 provided with a common reel 14 for the line 16. The reel has spaced parallel circular heads 18 and 20 as usual. The crank handle is denoted at 22 and provided with the usual swivelled knobs or grips 24. The customary finger-piece carried by the reel seat is denoted at 26, and when the handle is inserted into the socket for use, the finger-piece rests against an outstanding extension providing a saddle 28, the latter projecting from one side of the upper end portion of the socket member 6. With reference to Fig. 3 in particular, it will be noted that the upper end portion 30 of the socket member is extended and proximately semi-circular in cross-section. However the central portion thereof is provided with a struck-out tongue which defines a notch which intervenes between the two extensions 32 and 34. This construction also provides the metal which is struck-out in the manner of a tongue and is then marginally flanged and fashioned into the flanged seating saddle 28 for the finger piece 26. In other words, this is not just a plain struck-out tongue which forms the saddle but the tongue is shaped up to provide the flanges and to conformingly receive and key the finger piece therein. By having the extremities or upper ends of the two extensions 32 and 34 rounded these members tend to pilot the finger piece into the notch and to effectively seat it in the saddle. Sometimes the fisherman simply "drops" the handle of the fishing rod into the socket and it more or less settles in position by taking the position illustrated in the drawing. Also this position is such that since the handle of the rod does not turn axially, it locates the reel in proper relationship with the circuit make-and-break means of the flashlight. That is to say with the reel keyed against accidental rotation the reel has the ready-to-function position seen to advantage in Fig. 1.

With respect now to the illuminable or visual signaling means, it is to be mentioned at the outset that this does not have to be a "visual" signal. That is to say, it could be an audible signal if desired. However, the expression "signal" is thought to be adequately comprehensive. In any event, the signaling means is broadly identified as a flashlight 36 having a suitable casing 38 (Fig. 2) containing cooperating dry cell batteries 40 and 42 suitably held in place. The upper end portion of the casing 38 is closed here at 44, apertured and provided with a novel rubber or other equivalently insulated bushing 46 having a screw-threaded hole 48 registering with the contact button 50 on the battery 40. The screw-threaded hole serves to accommodate the screw base 52 and the base is screwed through the hole and into engagement with the contact button 50. The bulb proper 54 is disposed centrally and in a plane above the top of the cap.

The circuit make and break means is simple. That is to say, it preferably comprises a current conducting L-shaped clip 56. The long arm 58 has a hole therein for passage of the screw base 52. Therefore, the bulb when screwed in place serves as a means to attach the clip. The shorter vertical leg 60 provides a relatively stationary contact element. The cooperating contact means is denoted generally by the numeral 62 and, as shown in Fig. 2, it comprises a coil spring 64.

The coil spring 64 is suitably enclosed and fastened for operation in a sheath 66 mounted on one side of the battery casing just below the top or upper end 44. The lower arm or end portion of the spring extends below the sheath. The upper arm 68 extends above the sheath and curves somewhat at an oblique angle so that it is directly over and is cooperable with the stationary contact point or member 60. The finger 68 is of springy metal and the inherent tension serves to cause the finger to spring down and bridge the contact element 60 and thus close the circuit and light the light. So that this signal does not come into play or effect until a bite is had, it will be evident that the free end portion of the contact finger 68 rests atop the knob or handle 24. Therefore, when the line is carried out by the victim-fish, the reel starts to unwind and the crank 22 turns thus releasing the finger 68 allowing it to drop down on the contact 60 to close the circuit. There are times when one does not desire to use the contact finger and in this case a plastic sleeve or any sleeve of suitable insulation 70 is slipped over the finger and rests directly on the contact 60 thus breaking the circuit. In other words, the numeral 70 designates a readily applicable and removable sleeve or guard. In order to permit the finger 68 to function the guard has to be slipped off and the free end of the finger allowed to rest on the knob 24 in the manner shown in full lines in Fig. 2. Once the circuit is closed, the bulb 64 remains lighted or on until thes fisherman lifts the finger off the contact 60 and slips the circuit breaking insulation sleeve 70 over the finger.

The same basic idea is carried out in the modification or construction shown in Fig. 5. In fact in this figure it is necessary to show, it is believed, only the variation and the construction of the flashlight. In other words, the flashlight here is the same as already described and for that reason it is denoted by the numeral 36A. The casing is denoted at 38A and the battery at 40A. The bulb or lamp 54A has a base 52A engaging the contact button 50A. The L-clip 56A has the same long arm 58A and short arm or contact element 60A.

In this modification, a screw cap 72 of insulation material is provided and has a screw-threaded hole centered therein to accommodate the screw base 52A. Instead of using the insulated screw-threaded bushing 46 previously described the cap 72 itself is constructed of insulation material and the connection and arrangement is as illustrated in Fig. 5.

Also, in this arrangement the coil spring 74 has a depending end portion 76 with a terminal 78 suitably welded or fixed on the battery case or casing 38A. The relatively removable spring contact finger here is denoted at 80. This finger is diagonally disposed and it is normally of such inherent resiliency that it stays put in the straight released position shown in full lines. By interposing the finger between the contact 60A and one of the handle knobs 24, it will be seen that in case of a bite the reel starts to unwind and the handle turns around and each cycle of revolution causes the knob 24 to cam against the finger 80 and to press it into engagement with the contact element 60A. This results in an intermittent opening and closing of the signaling light circuit.

Minor changes in shape, size, materials, and arrangement of parts may be resorted to in actual practice without departing from the spirit of the invention of the scope of the invention as claimed.

What is claimed as new is as follows:

1. In combination, a socket member open at its top and adapted to telescopically receive a handle portion of a fishing rod, and having a pair of upstanding guides and an intervening but outstanding extension providing a finger-piece accommodating and seating saddle, a flashlight embodying a casing fastened to and disposed alongside said socket member, a relatively stationary contact element mounted on an upper end portion of the casing and provided with a readily applicable and removable lamp bulb with a base, and said base being passed through an opening provided therefor in the contact element to assist in mounting the element in place on the flashlight case, a coil spring having a longitudinally bowed resilient finger the inherent resiliency of which normally engages the finger with the adjacent stationary contact element to complete a circuit to the bulb, said finger being adapted to be releasably placed and suspended in a cocked position out of engagement with said stationary contact element on one of the knobs of the turning crank of a fishing reel so that when the usual line on said reel starts to pay out and the crank handle turns around the finger is released and allowed to spring toward and rest in constant engagement with the contact element.

2. The structure defined in claim 1, and wherein said guides provide a space between themselves and assist in piloting the aforementioned finger-piece into said saddle, said saddle being provided along its lengthwise edges with upwardly and suitably curved flanges which serve to releasably "key" the finger-piece in the saddle until it has been bodily lifted therefrom by removing the handle portion of the fishing rod from the socket member.

3. An illuminable fishing rod holder for night fishing comprising a socket member open at the top and provided with an extension at its open top portion, said extension being provided with a stuck-out tongue, said tongue defining a saddle, and portions on the opposite sides of the tongue providing guiding and piloting elements, said saddle being marginally flanged and shaped to provide for the removable reception therein of a finger-piece such as is carried by the usual reel seat on a fishing rod, said saddle serving to prevent rotation of the rod in the socket member, a flashlight having a casing supported alongside of and by way of said socket member, said flashlight being provided at its upper end with a bulb, an exposed fixed contact element, and an exposed elongated longitudinally bowed finger providing a movable contact element, said movable contact being mounted on the flashlight casing and extending toward and above the stationary contact element so as to normally engage the same and being releasably engageable with the usual crank handle means on the reel carried by the fishing rod when disengaged from the first named contact element.

References Cited in the file of this patent

UNITED STATES PATENTS

| | | |
|---|---|---|
| 1,834,612 | Gillingham | Dec. 1, 1931 |
| 2,599,099 | Folker | June 3, 1952 |
| 2,704,412 | Davis | Mar. 22, 1955 |
| 2,810,981 | Littau | Oct. 29, 1957 |